United States Patent [19]

Brunner

[11] Patent Number: 4,590,958
[45] Date of Patent: May 27, 1986

[54] TWO-POSITION SWITCHING VALVE HAVING HYDRAULIC SELF-HOLDING PROPERTIES

[75] Inventor: Rudolf Brunner, Baldham, Fed. Rep. of Germany

[73] Assignee: Heilmeier & Weinlein Fabrik fur Oel-Hydraulik GmbH & Co. KG, Munich, Fed. Rep. of Germany

[21] Appl. No.: 774,567

[22] Filed: Sep. 10, 1985

[30] Foreign Application Priority Data

Sep. 12, 1984 [DE] Fed. Rep. of Germany ....... 3433535

[51] Int. Cl.⁴ ............................................. F16K 17/04
[52] U.S. Cl. ....................................... 137/115; 137/494
[58] Field of Search ............... 137/115, 116, 472, 494, 137/613; 417/307; 91/451

[56] References Cited

U.S. PATENT DOCUMENTS 2,316,445  4/1943  Marshall ............................ 137/116
2,680,447  6/1954  Groves ............................... 137/116
3,922,954 12/1975  Gustafsson et al. ............. 137/115 X

FOREIGN PATENT DOCUMENTS 1254925 11/1967 Fed. Rep. of Germany ...... 137/494

Primary Examiner—Martin P. Schwadron
Assistant Examiner—Stephen M. Hepperle
Attorney, Agent, or Firm—Kinzer, Plyer, Dorn & McEachran

[57] ABSTRACT

The invention relates to a two-position switching valve having hydraulic self-holding properties and comprising a closure piston disposed in a flow path for displacement between an open position and a closure position for controlling a pressure between a maximum value and a minimum value, and operatively coupled to a control piston mounted for displacement in a housing. In known switching valves of this type, a creeping approach of respective switching points is scarcely avoidable under certain operating conditions. In accordance with the invention, a reliable switching function is achieved by forming the housing bore as a continuous stepped bore for slidably guiding therein a stepped piston consisting of a closure piston, a control piston, and a piston portion and by providing alternately openable and closable flow connections therein permitting an annular space between the closure piston and the piston portion to communicate with an annular chamber adjacent the control piston in the closure position of the closure piston, and the annular chamber to be pressure-relieved in the open position of the closure piston. These provisions result in the generation of a servo force for abrupt switch-over operation of the valve.

7 Claims, 2 Drawing Figures

TWO-POSITION SWITCHING VALVE HAVING HYDRAULIC SELF-HOLDING PROPERTIES

DESCRIPTION

The present invention relates to a two-position switching valve of the type defined in the generic clause of patent claim 1.

Passenger motor vehicles of a type known since more than 20 years are provided with a hydraulic system for the hydro-pneumatic suspension of the vehicle and other consumers. The hydraulic system is charged by a pump up to a maximum system pressure after the system pressure has dropped to a minimum system pressure. In the flow path between the pump and a reservoir there is provided a two-position switch-off valve controlled by the system pressure against the bias of a spring.

In the switch-off valve the closure element is a ball biased by a spring into engagement with a valve seat disposed between the pressure inlet and the pressure outlet. The control piston is acted on by the system pressure. Between the pump and the system there is provided a non-return valve. As long as the maximum system pressure is not attained, the non-return valve is open, and the closure element is held in engagement with the valve seat. The pump charges the system and is not in communication with the reservoir. As soon as the maximum system pressure is attained, the control piston is displaced thereby until it lifts the closure element off the valve seat by means of a plunger, so that the pump discharges into the reservoir and the non-return valve closes the flow connection back to the pump.

As this two-position switching valve is designed as a seat valve, its manufacture is relatively expensive. Furthermore it is impossible to reliably avoid a creep condition in which part of the pressure medium supplied by the pump and intended for the system escapes without being used, resulting in excessive load on the pump and heating of the pressure medium. This is because the closure element is capable of movement relative to the control piston so as to occasionally lift off its seat, so that the control piston is subjected to momentaneous pressure pulses opposing the system pressure acting thereon, resulting in an instable operation of the valve. The danger of this creep condition presents itself in particular when the system pressure approaches the minimum or maximum value extremely slowly.

Known from the periodical "Hydraulics and Pneumatics", April 1961, pages 69, 74 and 75, and FIG. 18, is a switching valve of this type wherein the closure piston and the piston portion define an annular groove therebetween which opens a flow path from the inlet to the pressure outlet in the open position of the closure piston. The closure piston and the piston portions are pressure-relieved at their end faces. A small-section control passage leads from the pressure inlet to a separate control chamber containing a control piston the diameter of which is greater than that of the closure piston, to which it is connected by the piston shaft. The variable system pressure acts on the control piston in opposition to the spring acting thereon in the pressure-relieved chamber, its opposite side, diminished in surface area by the piston shaft, being acted on by the pressure derived from the pressure inlet. This switching valve suffers from the disadvantage that the control passage from the pressure inlet to the control chamber exerts a throttling effect due to which any rapid movement of the control piston and thus the closure piston to the open position is slowed down, as the control piston has to displace the pressure medium through the control passage against the pressure at the pressure inlet. This means that in case of the maximum pressure being rapidly approached, the flow connection from the pressure inlet to the pressure outlet is not opened sufficiently fast, so that the system pressure may rise beyond the maximum pressure. It is therefore necessary to dimension the pressure-receiving surfaces of the control piston and the force of the spring relative to one another in such a manner that the maximum pressure limit of the system is not surpassed particularly in the case of its being rapidly approached.

It is then unavoidable, however, that in the case of the maximum pressure being approached very slowly, the throttling effect of the control passage makes itself felt to a lesser degree, so that the closure piston opens the flow path from the pressure inlet to the pressure outlet prematurely, resulting in the system pressure remaining below the desired maximum pressure. In the case of the maximum pressure being approached very slowly it may also happen that the closure piston already opens a gap communicating with the pressure outlet without the maximum pressure having been attained, resulting in an equilibrium condition in which pressure medium at a system pressure below the maximum pressure flows through the non-return valve into the system and through the partially open and not further opening gap from the pressure inlet to the pressure outlet. Under this disfavourable operating condition the switching valve cannot be supplied with an abrupt switching pulse. The same applies to a very slow lowering of the system pressure, as this may also result in the establishment of an equilibrium condition in which the closure piston is prevented from returning to its closure position and leaves open a small gap, so that the pressure medium flows towards the system and towards the pressure outlet at the same time. This slow approach of the maximum pressure may occur in the hydraulic system of a vehicle wherein a consumer sonsumes a constant great amount of the hydraulic pressure medium. A very slow approach of the minimum pressure may on the other hand occur in a hydraulic system of a vehicle including a consumer consuming a very small constant amount. In both these operating conditions the non-occurrence of a sufficient pressure pulse for moving the closure piston results from the fact that the pressure variations transmitted via the control passage to the control chamber are retarded.

The retarded response of the control piston is not only due, however, to the throttling effect of the control passage, but also to the fact that the control passage opens into the pressure inlet upstream of the housing bore, whereat the throttling effect created between the flank of the annular groove and the closure piston adjacent the pressure inlet opening results in a considerable counterpressure being created at full output of the pump until the closure piston has been moved considerably further towards its open position. The throttling effect and the counterpressure prevent any abrupt pressure-relief of the respective side of the control piston and enable the closure piston to assume a fixed intermediary position as the maximum pressure is approached in a "creeping" manner, so that the pressure medium is supplied to the system and to the reservoir at the same time.

It is an object of the invention to improve a two-position switching valve of the type defiend above in such a manner that, although of simplified construction, it reliably ensures a definite switchover movement of the closure piston even when the minimum or maximum pressure limit in the system to be supplied are approached very slowly.

This object is attained according to the invention by the characteristics set forth in the characterizing clause of patent claim 1.

This construction reliably ensures the occurrence of an abrupt switching pulse at least on attaining the maximum pressure due to the fact that, irrespective of whether and how far the pressure inlet already communicates with the pressure outlet, and solely depending on the displacement of the closure and control pistons resulting from the magnitude of the system pressure, a servo pulse is generated to produce an abrupt force acting on the closure piston for abrupt switch-over operation of the switching valve.

The rising system pressure initially displaces the control piston upwards until the piston portion separates the annular chamber from the pressure inlet. At this instant the annular champer is abruptly pressure-relieved, and the control pressure displaces the closure piston to its open position, until the pump discharges into the reservoir. This servo effect occurs irrespective of how slowly the system pressure has risen, it being only of importance whether the maximum pressure limit has been attaiend. As long as subsequently the control pressure does not drop to the minimum limit, the control pressure holds the closure piston in its open position (self-holding effect). As the minimum pressure is attained, the spring displaces the closure piston downwards until the annular chamber is closed and, immediately thereafter, communication between the pressure inlet and the annular chamber is established. The closure piston already cooperates with the pressure outlet to generate a throttling effect prior to reaching its closure position. This results in a noticeable pressure increase in the annular space for the generation of an abrupt pressure pulse effective to abruptly displace the closure piston to its closure position and to maintain it therein (self-holding effect).

A further advantageous embodiment is disclosed in claim 2. These flow connections are realized in the stepped piston in a structurally simple manner, as the piston is subjected to very precise machining operations in any case. The manufacture of the housing with its housing bore is by contrast simple and inexpensive.

Also of importance is the provision according to claim 3, as it is effective to avoid the occurrence of a creep condition and a retarded or omitted switching operation.

The two-position switching valve according to the invention is particularly suitable for employ in the manner as set forth in claim 4. Thanks to the reliability of operation and the necessarily abrupt switching movements of the switching valve, it is now possible to avoid the disadvantages that had to be tolerated in hydraulic systems of this type due to the possible occurrence of creep conditions under certain operating conditions. Hitherto it was customary (DE-AS No. 20 30 382) to employ a main safety valve and an auxiliary control valve for establishing an idling condition on reaching an overload limit. The employ of the auxiliary control valve results in the problem, however, that in case of the overload limit being approached very slowly there may be established an equilibrium condition in which a forceful switching pulse fails to appear for contributing to the correct actuation of the main safety valve. Likewise, unavoidable pressure variations in the system cause the overload limit to vary in response to such pressure variations.

Embodiments of the subject matter of the invention shall now be described with reference to the drawings, wherein.

Figure 1:
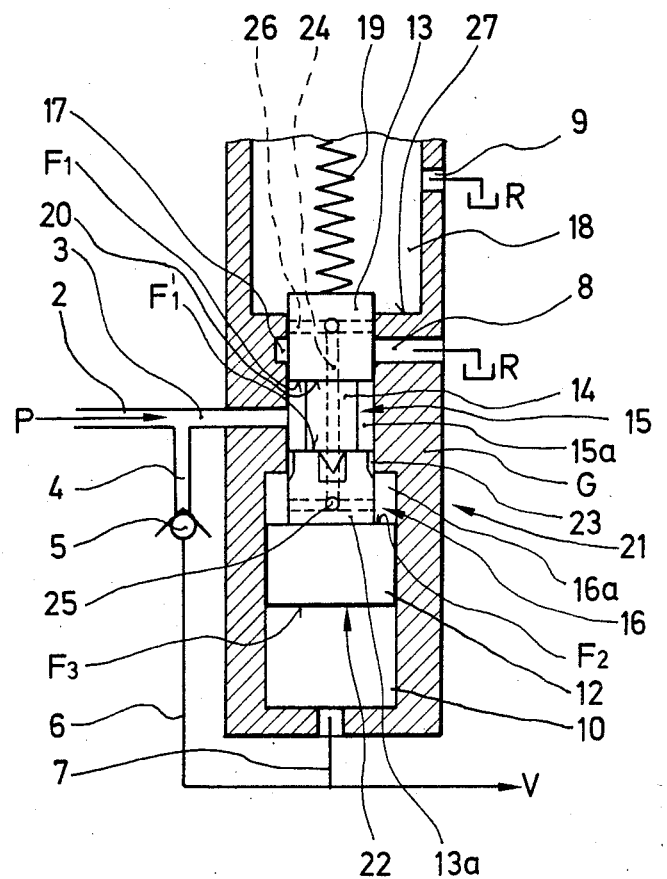
FIG. 1 shows a hydraulic system including a two-position switching valve.

Shown in FIG. 1 is part of a hydraulic system in which a consumer circuit V is supplied with pressure from a hydraulic pump P in such a manner that within the consumer circuit V there prevails at all times a pressure lying between a maximum pressure and a minimum pressure, the latter being still sufficient for the correct supply of all consumers in the system. To prevent pump P from being overloaded when the maximum pressure in consumer circuit V is attained, there is provided a two-position switching valve 21 operable on the maximum pressure being attained to communicate pump P with a reservoir R, so that pump P discharges substantially without any counterpressure.

Two-position switching valve 21 comprises a housing G formed with a pressure inlet 3 for connection to a pump discharge pipe 2 from which a branch pipe 4 including a non-return valve 5 leads to a feed pipe 6 connected to a consumer circuit V. Non-return valve 5 closes in the flow direction from pipe 6 to pipe 2 and opens in the opposite flow direction when the pressure in consumer circuit V is lower than that in pipe 2.

Housing G is formed with a stepped housing bore comprising a large-diameter first housing bore section 10, 16 a smaller diameter housing bore section 15 and a chamber 18 communicating with one another. Slidably guided in housing bore G is a stepped piston 22 comprising a two-part smaller-diameter piston section and a larger-diameter piston section connected to one another through a piston shaft 14 and forming a closure piston 13, a piston portion 13a spaced therefrom, and a control piston 12. Piston portion 13a is directly connected to the piston section forming control piston 12. Closure piston 13 is slidably guided in smaller-diameter housing bore section 15 and has its end projecting into chamber 18.

Pressure inlet 3 is connected to pipe 2 from pump P and opens laterally into smaller-diameter housing bore section 15 between a pressure outlet 8 communicating with reservoir R and larger-diameter housing bore section 16. Adjacent pressure outlet 8 smaller diameter housing bore section 15 is formed with a peripheral annular groove 17 cooperating with a control edge 20 formed on closure piston 13. Chamber 18 contains a spring 19 biasing closure piston 13 and thus the entire stepped piston 22, and is pressure-relieved by either being directly connected to reservoir R through a pipe 9, or by being connected to pressure outlet 8 through a separate conduit (not shown).

Closure piston 13 cooperates with piston postion 13a to define an annular space 15a in smaller-diameter housing borre section 15, while control piston 12 cooperates with piston portion 13a to define in larger-diameter housing bore section 16 an annular chamber 16a separated from annular space 15a by piston portion 13a. The opposing annular end faces F1 of closure piston 13 and F1' of piston portion 13a, respectively, are of equal size, so that the pressure prevailing in annular space 15a generates no axial force component. Piston portion 13a is formed with pockets 23 for establishing communication between annular space 15a and annular chamber 16a when stepped piston 22 is in the position shown in FIG. 1, in which closure piston 13 is in its closure position separating pressure inlet 3 from pressure outlet 8. In this position, the pressure in annular space 15a, i.e. the pressure generated by pump P for supplying consumer circuit V, is transmitted to annular chamber 16a to act on annular end face F2 in opposition to the same pressure acting on annular end face F3. This pressure cooperates with the force of spring 22 to hold stepped piston 22 in the position shown until maximum pressure is attained in consumer circuit V.

Stepped piston 22 is provided with a further flow connection in the form of a longitudinal passage 24 having inlets 25 in constant communication with annular chamber 16a, and outlets 26 cooperating with a control edge 27 in chamber 18 in such a manner that displacement of stepped piston 22 towards chamber 18 results in annular chamber 16a being pressure-relieved as soon as communication pockets 23 are closed by the interior wall surface of smaller-diameter housing bore section 15 so as to interrupt communication between annular space 15a and annular chamber 16a. At this instant, i.e. as soon as outlets 26 pass control edge 27, the pressure in annular chamber 16a is relieved, so that annular end face F2 is no longer subjected to a force acting thereon. The force acting on end face F3 of control piston 12 causes stepped piston 22 to be abruptly displaced upwards until closure piston 13 has reached its open position in which pressure inlet 3 communicates with pressure outlet 8. Non-return valve 5 closes, consumer circuit V is at maximum pressure, and pump P discharges into reservoir R without counterpressure. A similar servo effect is achieved on displacement of stepped piston 22 in the opposite direction when the pressure in consumer circuit V approaches its minimum value. This is because the force resulting from the pressure acting on end face F3 decreases sufficiently for permitting stepped piston 22 to be displaced downwards by spring 19, until at first outlets are closed, followed by flow pockets 23 being uncovered to establish communication between annular space 15a and annular chamber 16a, resulting in the latter being supplied with pressure acting on annular end face F2 to abruptly displace piston 22 downwards.

Figure 2:
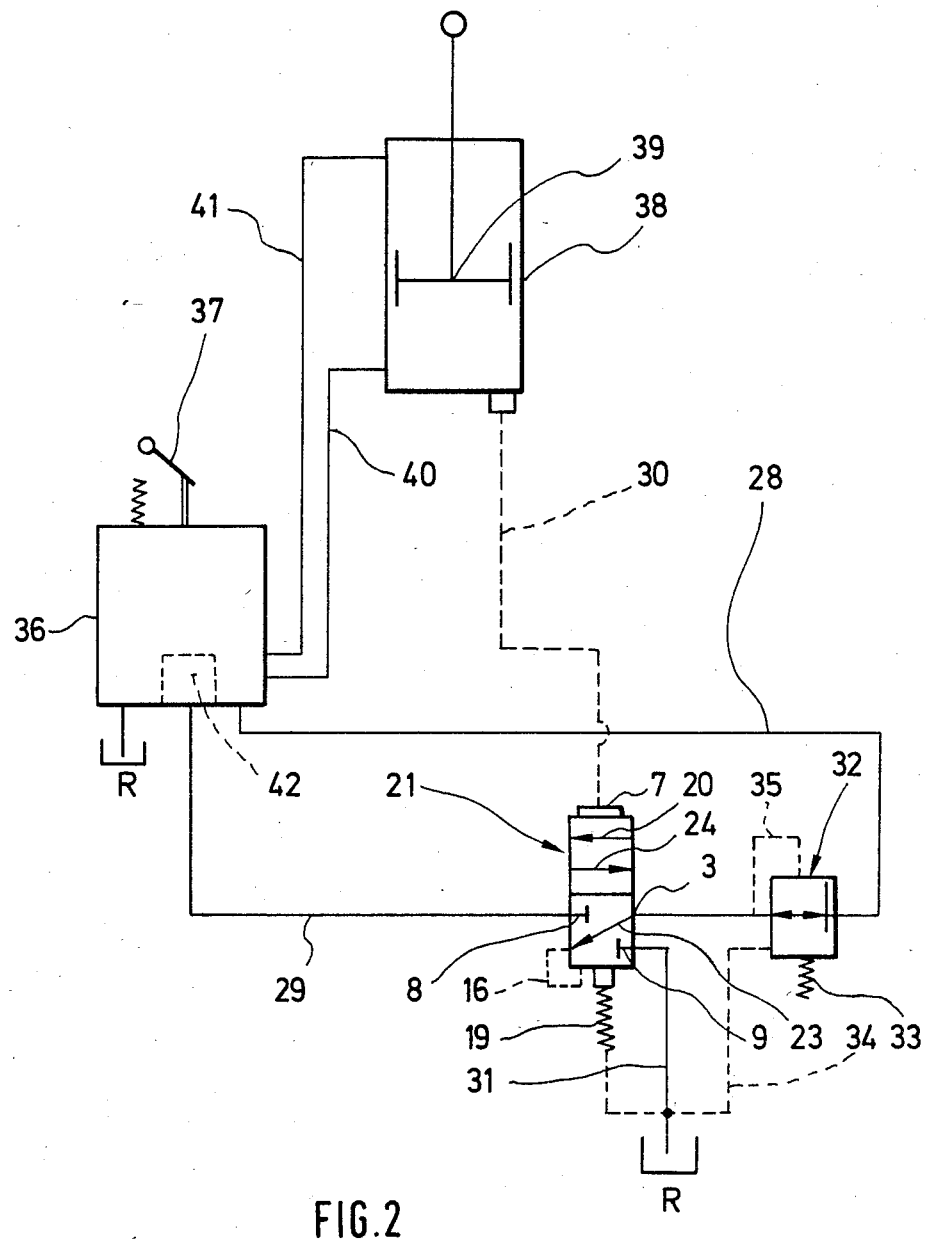
FIG. 2 shows another hydraulic system including an overload safety feature and the two-position switching valve of FIG. 1, the latter being only diagrammatically indicated.

The hydraulic system shown in FIG. 2 is provided with an overload safety feature. The hydraulic system may for instance be that of a hydraulic crane including a control valve 36 operated by a lever handle 37 for controlling actuation of a lift cylinder 38. Lift cylinder 38 contains a piston 39 adapted to be slidingly displaced therein in response to pressure being supplied through a lift circuit 40 or a lowering circuit 41. Included in control valve 36 is an idling control device 42 of conventional construction adapted to actuate a switch-off or idling valve associated with control valve 36 when a load limit not to be transgressed is reached for lift cylinder 38. Connected to lift cylinder 38 is a control pressure circuit 30 containing a control pressure proportional to the load acting on lift cylinder 38. A further control circuit 28 tapping control valve 36 is adapted to communicate with a circuit section 29 connected to indling device 42 for actuating the latter as the load limit is reached. Control circuit 28 is connected to the pressure supply (not shown) of the hydraulic system, so that the pressure supplied thereto varies in response to the operating conditions. The two-position switching valve 21 shown in FIG. 1 is connected between control circuit 28 and circuit section 29 for establishing communication therebetween when a signal representing attainment of the load limit appears in control circuit 30.

The two-position switching valve of FIG. 1 as diagrammatically shown in FIG. 2 has a control pressure inlet 7 for pressure supply to the control piston. Control circuit 28 is connected to pressure inlet 3, while circuit section 29 connects pressure outlet 18 to idling device 42. Outlet 9 has a return line 31 connected thereto.

In the position of switching valve 21 as shown, the pressure prevailing in control circuit 30 is sufficiently low to indicate that the hydraulic system operates below its load limit. The closure element is in its closed position, so that control circuit section 28 maintains its pressure. This pressure may for instance be the holding pressure for an idling valve adapted to assume its idling position for at least partially passivating control valve 36 when the holding pressure disappears. As indicated at 16, the pressure from control circuit section 28 is supplied from annular space 15a through flow pockets 23 to annular chamber 16a for holding stepped piston 22 in this position against the bias of spring 19.

Connected in control circuit section 28 is a pressure reducing valve 32 of known construction, set to a predetermined pressure by means of a spring 33 so as to maintain the set pressure for supply to pressure inlet 3 of switching valve 21 irrespective of pressure variations in control circuit section 28. To this purpose pressure reducing valve 32 is provided with an auxiliary control line 35 and a relief line 34 connected to return line 31. In this manner it is ensured that a constant pressure prevails at pressure inlet 3, so that the pressure prevailing in annular chamber 16a is not either subjected to variations. As a result, switching valve 21 is solely controlled in response to the pressure in control line 30.

As on attaining the load limit the pressure signal in control line 30 rises to a level whereat the force acting on control piston 12 is capable of overcoming the pressure acting on end face F2 and the bias of spring 19, stepped piston 22 is displaced, resulting in annular chamber 16a being isolated from annular space 15a and permitting the pressure in annular chamber 16a to be relieved via outlet 9 and return line 31, so that the pressure from control line 30 acting on control piston 12, or the end face F3 thereof, is effective to abruptly displace stepped piston 22 to its second switching position. In this position, control edge 20 of control piston 13 establishes communication between pressure inlet 3 and pressure outlet 8, so that the holding pressure prevailing in control circuit section 28 is relieved via circuit section 29 and idling device 42 for deactivating control valve 36. Under these conditions, further supply of pressure medium to lift circuit 40 of lift cylinder 38 is no longer possible, and any other consumers connected to control valve 36 and responsible for the attainment of the load limit are deactivated, respectively, until measures are taken for reducing the load below this limit. As the load is thus reduced below its limit, the pressure in control line 30 and thus at control piston 12 of switching valve 21 drops below a certain level, enabling spring 19 to displace stepped piston 22 in the opposite direction so as to abruptly interrupt the flow connection between the pressure inlet and the pressure outlet and to permit the pressure required for operation of control valve 36 to be built up and maintained in control circuit section 28.

I claim:

1. A two-position switching valve having hydraulic self-holding properties, comprising a housing bore forming part of a flow path from a pressure inlet to a radial pressure outlet, a closure piston mounted for reciprocating displacement between a closure position and a relief position in a reduced-diameter portion of said housing bore, a control piston disposed in an enlarged-diameter portion of said housing bore and connected to said closure piston by a piston shaft carrying a piston portion having the diameter of said closure piston, said closure piston cooperating with said piston portion to define an annular space in said reduced-diameter bore portion, said control piston having its end facing away from said closure piston acted on by a control pressure varying between a maximum and a minimum limit, and its other, smaller end, by the pressure prevailing in said pressure inlet, and a spring disposed in a pressure-relieved chamber at the side of the closure piston facing away from said control piston to bias said closure piston in the direction of said closure position in opposition to the control pressure acting on said control piston, characterized in that said pressure inlet (3) opens into said annular space (15), that said piston portion (13a) is disposed adjacent said control piston (12) and cooperates therewith to define an annular chamber (16a) in the larger-diameter housing bore portion (16), and in that between said annular space (15a) and said annular chamber (16a) and between said annular chamber (16a) and said pressure-relieved chamber (18) or said pressure outlet (8), respectively, there are provided exclusively alternately openable and closable flow connections (23;24), one said flow connection (23) connecting said annular space (15a) to said annular chamber (16a) when said closure piston is in its closure position, while another flow connection (24) connects said annular chamber (16a) to said pressure relieved chamber (18) when said closure piston (13) is in its relief position.

2. A two-position switching valve according to claim 1, characterized in that said flow connection (23) between said annular space (15a) and said annular chamber (16a) is formed by pocket-shaped recesses (23) in said piston portion (13a) adapted to be obturated by the wall of said reduced-diameter housing bore portion (15), and that said flow connection (24) between said annular chamber (16a) and said chamber (18) comprises a longitudinal passage in said piston shaft (14) continuously communicating with said annular chamber (16a) through said piston portion (13a) and being formed in said closure piston (13) with an outlet (26) opening into said chamber (18) or towards said pressure outlet (8).

3. A two-position switching valve according to claim 1, characterized in that said flow connection (23) between said annular space (15a) and said annular chamber (16a) is adapted to be closed prior to said flow connection (24) between said annular chamber (16a) and said chamber (18) being permitted to be opened.

4. A two-position switching valve according to claim 1, characterized by its employ in a hydraulic overload preventer of a hydraulic system of a crane comprising an idling control device (42) adapted to be actuated on reaching the maximum pressure in the system, the system pressure acting on said control piston and said pressure inlet (3) and pressure outlet (8) are connected to control pipes (28, 29) leading to said idling control device (42), a preferably adjustable pressure reduction valve (32) being included in said control pipes (28, 29) upstream of said switching valve (21).

5. A two-position switching valve according to claim 2, characterized in that said flow connection (23) between said annular space (15a) and said annular chamber (16a) is adapted to be closed at the same time as said flow connection (24) between said annular chamber (16a) and said chamber (18) is permitted to be opened.

6. A two-position switching valve according to claim 2, characterized by its employ in a hydraulic overload preventer of a hydraulic system of a crane comprising an idling control device (42) adapted to be actuated on reaching the maximum pressure in the system, the system pressure acting on said control piston and said pressure inlet (3) and pressure outlet (8) are connected to control pipes (28, 29) leading to said idling control device (42), a preferably adjustable pressure reduction valve (32) being included in said control pipes (28, 29) upstream of said switching valve (21).

7. A two-position switching valve according to claim 3, characterized by its employ in a hydraulic overload preventer of a hydraulic system of a crane comprising an idling control device (42) adapted to be actuated on reaching the maximum pressure in the system, the system pressure acting on said control piston and said pressure inlet (3) and pressure outlet (8) are connected to control pipes (28, 29) leading to said idling control device (42), a preferably adjustable pressure reduction valve (32) being included in said control pipes (28, 29) upstream of said switching valve (21).

* * * * *